(12) United States Patent
Brown

(10) Patent No.: US 11,180,091 B2
(45) Date of Patent: Nov. 23, 2021

(54) MOUNTING PEDESTALS

(71) Applicant: Focus Auto Design Inc., Calgary (CA)

(72) Inventor: Chris Brown, Calgary (CA)

( * ) Notice: Subject to any disclaimer, the term of this patent is extended or adjusted under 35 U.S.C. 154(b) by 75 days.

(21) Appl. No.: 16/880,959

(22) Filed: May 21, 2020

(65) Prior Publication Data

US 2020/0369221 A1  Nov. 26, 2020

(30) Foreign Application Priority Data

May 22, 2019 (CA) .................................. CA 3044040

(51) Int. Cl.
| | |
|---|---|
| *A47F 5/00* | (2006.01) |
| *B60R 13/00* | (2006.01) |
| *F16M 13/02* | (2006.01) |
| *B60R 11/00* | (2006.01) |
| *F16B 11/00* | (2006.01) |

(52) U.S. Cl.
CPC ............ *B60R 13/005* (2013.01); *B60R 11/00* (2013.01); *F16B 11/006* (2013.01); *F16M 13/022* (2013.01); *B60R 2011/008* (2013.01)

(58) Field of Classification Search
CPC . B60R 13/005; B60R 11/00; B60R 2001/008; F16B 11/06; F16M 13/022
USPC ................ 24/289; 296/91, 152, 180.1, 146.1
See application file for complete search history.

(56) References Cited

U.S. PATENT DOCUMENTS

| | | | | |
|---|---|---|---|---|
| 5,314,280 A | * | 5/1994 | Gagliardi ............ | B62D 25/163 29/525.02 |
| 6,892,427 B2 | * | 5/2005 | Kinzel ................ | B62D 35/005 24/289 |
| 6,932,416 B2 | * | 8/2005 | Clauson ............. | B60R 13/0206 296/146.7 |
| 7,178,206 B2 | * | 2/2007 | Kuhnle .............. | B60R 13/0206 24/297 |
| 7,204,000 B2 | * | 4/2007 | Benedetti ............ | F16B 5/123 24/293 |
| 9,089,961 B2 | * | 7/2015 | Fleck .................. | F16B 37/145 |
| 10,519,993 B2 | * | 12/2019 | Avalos Sartorio .... | F16B 5/0088 |
| 10,807,652 B2 | * | 10/2020 | Bauer ................. | B29C 70/088 |

* cited by examiner

Primary Examiner — Todd M Epps
(74) Attorney, Agent, or Firm — Thomas E. Malyszko

(57) ABSTRACT

A pedestal for mounting an accessory onto a vehicle surface has a hollow core body with an oblong first slot at a top end for receiving a fastener therethrough and an oblong second slot within for holding a nut and engaging the fastener. The fastener and nut are linearly adjustable in a first direction along the slots for ease of aligning the accessory's mounting hole with the pedestal and fastener, so as to secure the accessory to the pedestal's top end with the fastener. The body may also have wider oblong slots and additional side body slits for fitting an elongate bar nut, to provide greater adjustability in a second direction within the pedestal for enhanced two dimensional alignment of the accessory with the pedestal and fastener. A skirt and adhesive pad at the bottom end of the body securely bond the pedestal, and hence the accessory, to the vehicle surface.

20 Claims, 14 Drawing Sheets

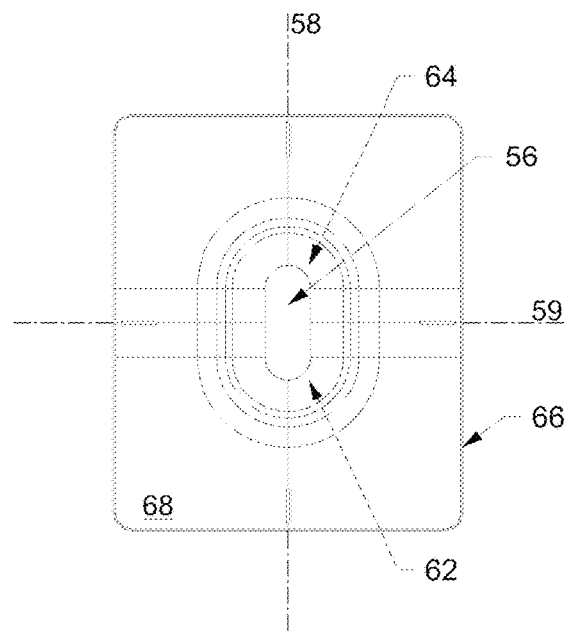
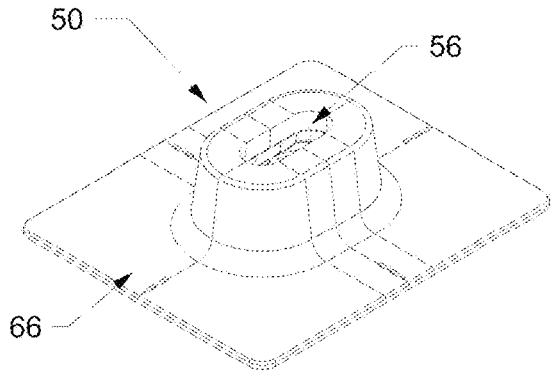
FIG. 6a
FIG. 6b
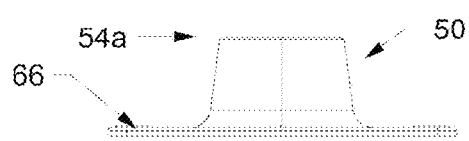
FIG. 6c
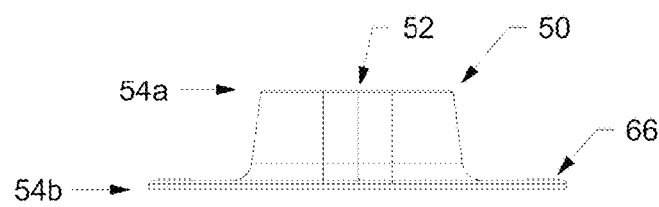
FIG. 6d

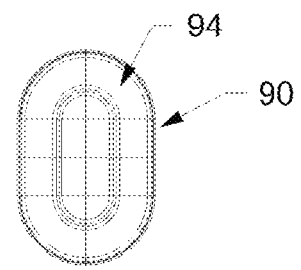
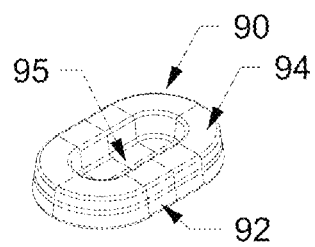
FIG. 8b　　　　　FIG. 8a
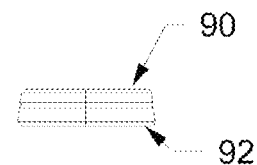
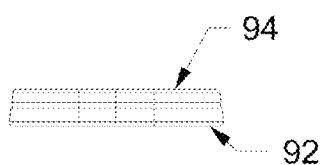
FIG. 8c　　　　　FIG. 8d

MOUNTING PEDESTALS

FIELD OF THE INVENTION

The present invention relates to pedestals for mounting objects onto structures in general, and in particular to pedestals for mounting automotive accessories, such as hood deflectors, fender flares and side door window visors.

BACKGROUND OF THE INVENTION

Automotive accessories, such as hood deflectors (a.k.a. hood protectors, bug shields, wind deflectors, etc.), are mounted to a wide range of vehicles, including passenger automobiles ("cars"), trucks, sport-utility vehicles ("SUV") and the like. These deflectors are typically made of a stiff but moldable material, like shatter-resistant plastic, redirecting wind, insects and debris away from the vehicle to which they are mounted, to avoid impacting or damaging areas of the vehicle's exterior body surface. To describe some available accessory mounting options, vehicle hood deflectors (excluding protectors made of flexible fabric) are chosen for illustrative purposes.

There are many configurations of hood deflectors, and hardware for holding the deflectors on the hoods. In one version the deflector extends transversely the width of the hood and wraps under the hood's leading edge to form a mounting tab or lip generally extending the width of the hood. A series of transversely spaced holes are provided along the mounting tab to accept screws, expansion plugs or other like hardware for mounting into either existing holes beneath the hood or holes drilled by an installer. A variant of this system provides for the use of hook and loop material to fasten the mounting tab to the underside of the hood, either with or without additional mechanical assistance. In another version of hood deflector where there is inadequate clearance below the hood for the deflector to wrap underneath, the deflector extends to the leading edge of the hood and is provided with some other form of tabs or "end clips" to hold it to that leading edge. These end clip designs suffer from several disadvantages. One prior art design provides an E-shaped clip forming two channels where the lower channel inserts onto the leading edge of the hood and the other (upper) channel inserts onto the outer portion of the protector. This design is both visually and functionally undesireable since the clip may release from the deflector and/or hood due to wind induced movements, or in environments such as car washes.

A retaining clip produced by the applicant, as shown in its U.S. Pat. No. 6,892,427 and CA patent 2,392,748, successfully overcame the above and other prior art deficiencies, but it's focus was on clamping at a specific location on the hood, namely along the hood's leading free edge, which unfortunately is not currently possible in all instances due to evolving hood shapes and deflector designs. It also employed a plastic plug for engaging the hole in the hood deflector, which enjoys advantages functionally, but is not always visually desired by current users.

Subsequent versions of a deflector mounting system developed, used and sold as early as 2007 employ a hood-mounted pedestal illustrated in FIG. 1, and more recently shown in U.S. patent application Ser. No. 14/931,425 (by Avalos Sartorio et al.). This type of pedestal has a base forming a mounting surface for adhesion to a hood surface, and an upstanding body extending from the base with a threaded insert for receiving a bolt to affix a deflector to the pedestal. Each pedestal is paired up with a spaced mounting hole in the deflector. This system is effective for mounting the deflector in a variety of desired positions on the hood, but a persistent drawback is that each pedestal must be mounted on the hood in precise alignment with its respective hole in the deflector. Such mounting can be demanding and frustrating for users, leaving little room for error, since misaligned pedestals can be difficult to unglue from a hood, risking damage to the painted surface.

What is therefore desired is a novel mounting pedestal which overcomes the limitations and disadvantages of existing mounting systems, and should be suited to engage holes in a vehicle accessory such as a hood deflector, to securely mount the accessory on the vehicle and advantageously present a certain appearance. It should provide versatility as to its mounting location on the vehicle, and should not require drilling or piercing into the vehicle skin for mounting purposes, to avoid permanent disfigurement or damage to the vehicle, but yet should allow use of a fastener, such as a metal bolt, to hold the accessory to the pedestal, and for desired visual effect. Importantly, the pedestal should be more forgiving and user-friendly than prior mounting systems by providing the user with greater latitude, or margin of error, for placement on a vehicle surface, namely an element of adjustability in at least one dimension, to more readily align an accessory hole with the pedestal, especially once the pedestal is fixed to the vehicle surface, for ease of securing the accessory to the pedestal and thereby to the vehicle surface.

SUMMARY OF THE PRESENT INVENTION

In one aspect the invention provides a pedestal for mounting an object onto a structure using a fastener, said pedestal comprising:
   a body with a hollow core having:
   a first end wherein said core forms an oblong first slot to permit insertion of said fastener therethrough and to allow said fastener to slide in a first direction along a longitudinal first axis for adjustability therealong;
   an opposed second end having an opening into said hollow core and a skirt formed about the periphery thereof defining a generally planar outer face; and,
   an intermediate portion between said first and second ends defining an oblong second slot aligned generally concentrically with said first slot for slidably receiving a nut member and restraining its rotation therein, said second slot being sized with a larger periphery than said first slot to form a shoulder stop therewith to block entry of said nut member into said first slot and to not impede said linear adjustability along said first axis; and,
   a pad with an inner surface for mating with said outer face of said skirt and an opposed outer surface for bonding with said structure;
   wherein said fastener secures said object to said first end of said body upon tightening said fastener to said nut member in said second slot.

In another aspect the invention further provides a pedestal wherein opposed sides of said body at said intermediate portion are notched to form elongate slits therethrough, each slit extending in said first direction along a longitudinal axis generally parallel to said first axis to not impede said linear adjustability along said first slot; wherein said nut member includes opposed elongate flanges, each flange being sized to project through one of said slits when inserted in said second slot of said hollow core; and, wherein said first slot is sized in a second direction along a lateral second axis generally perpendicular to said longitudinal first axis to allow for adjustability in said second direction in addition to adjustability in said first direction.

In yet another aspect the invention provides a pedestal for mounting an accessory with at least one hole therethrough onto a vehicle surface comprising:

a fastening assembly having a fastener with a head and stem extending therefrom, and a nut for mechanically engaging said stem;

a body having a hollow core with:

a first end wherein said core forms an oblong first slot for passing said stem therethrough and allowing said fastener to slide in a first direction along a longitudinal first axis for linear adjustability therealong; an opposed second end having an opening into said hollow core; and, an intermediate portion between said first and second ends defining an oblong second slot aligned generally concentrically with said first slot for receiving said nut and restraining its rotation therein, said second slot being sized with a larger periphery than said first slot to form a shoulder stop therewith to block entry of said nut into said first slot and to not impede said linear adjustability along said first axis; and, a skirt formed about the periphery of said body at said second end defining a generally planar outer face; and, a pad with an inner surface for mating with said outer face of said skirt and an opposed outer surface for bonding with said vehicle surface;

wherein said fastener stem is adapted to pass through said hole in said accessory to sandwich said accessory between said fastener head and said first end of said body upon tightening said fastener to said nut in said second slot.

BRIEF DESCRIPTION OF THE DRAWING FIGURES

Embodiments of the invention will now be described, by way of example only, with reference to the accompanying drawings, wherein:

FIG. 6a is a perspective view of the body of the mounting pedestal of FIG. 2 in isolation;

FIG. 6b is a top plan view of the body of FIG. 6a;

FIG. 6c is an elevational view of the body from the front of FIG. 6b;

FIG. 6d is an elevational view of the body from the right side of FIG. 6b;

FIG. 8a is a perspective view of the plug of the mounting pedestal of FIG. 2 in isolation;

FIG. 8b is a top plan view of the plug of FIG. 8a;

FIG. 8c is an elevational view of the plug from the front of FIG. 8b;

FIG. 8d is an elevational view of the plug from the right side of FIG. 8b;

FIG. 13b is a top plan view of the body of FIG. 13a;

FIG. 15a is a perspective view of the plug of the mounting pedestal of FIG. 9 in isolation;

FIG. 15b is a top plan view of the plug of FIG. 15a;

DESCRIPTION OF EMBODIMENTS OF THE INVENTION

Figure 1:
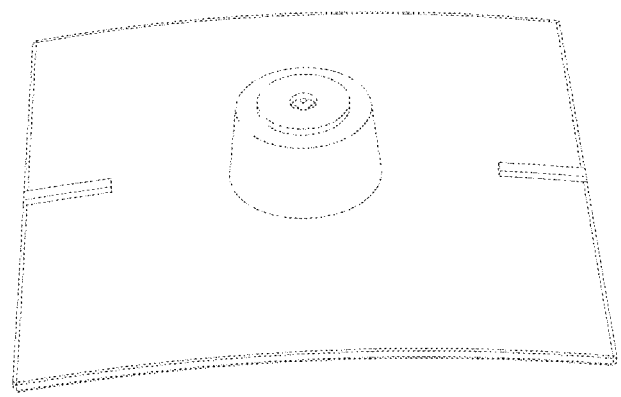
FIG. 1 shows a prior art mounting pedestal.

The figures show a mounting pedestal according to the present invention for mounting automotive accessories, such as hood deflectors and side window visors, to a wide variety of motor vehicles (herein "vehicles"). It will be understood this mounting pedestal, or "pedestal", may also be used for mounting other objects unrelated to automobiles onto structures aside from vehicles. However, for ease of reference and illustrative purposes only, the pedestal will be described as used for mounting a hood deflector (generally designated by reference numeral 30, and shown in ghost in FIG. 2) near or over the front edge 22 (a.k.a. a leading or free edge) of a vehicle's hood 20, above the vehicle's front grill 24. The hood 20 is most often a planar skin of metallic or like rigid material having a painted outside surface 26, contoured to conform to a desired profile, and attached to a sub-frame (not shown) for structural support.

Figure 2:
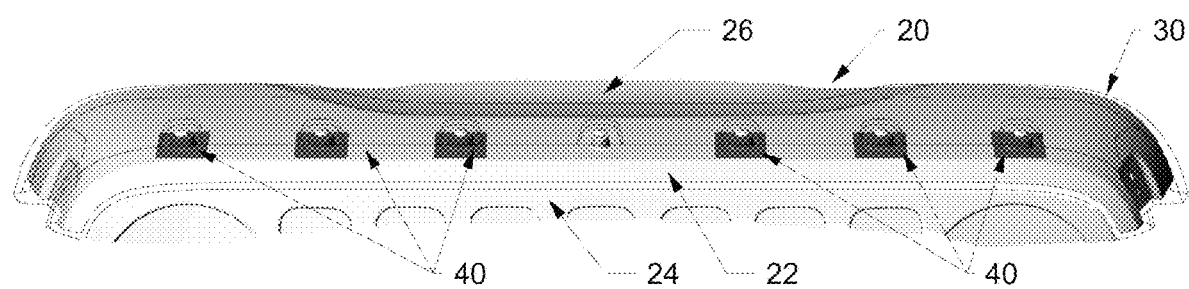
FIG. 2 is a perspective view from above showing a hood deflector in ghost mounted on the front end of a vehicle's hood, above its front grill and headlights, using a plurality of longitudinally spaced mounting pedestals according to the present invention.
Figure 5:
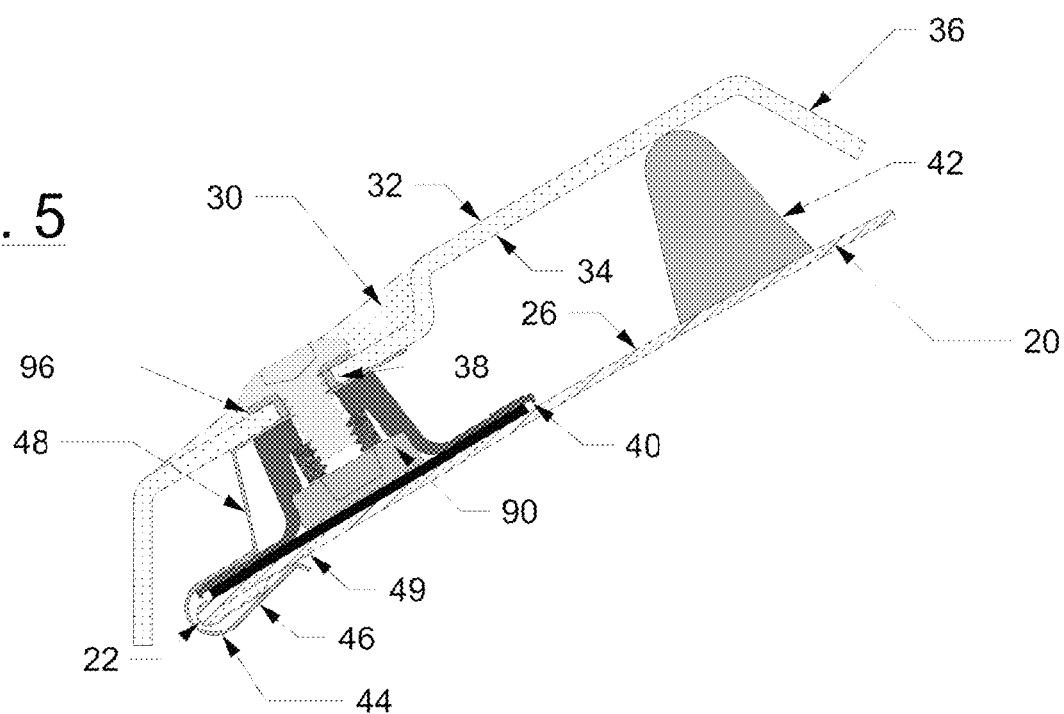
FIG. 5 is a cross-sectional view of a hood deflector secured to the mounting pedestal as seen in FIG. 4b which has been fixed to a vehicle's hood, and also illustrates use of an optional bracket and bumpon.

The deflector 30 (as illustrated in FIGS. 2 and 5) is typically made of a panel of sheet material, most commonly a fairly stiff plastic, having opposed top and bottom surfaces 32 and 34, respectively, shaped to generally follow the contour of the hood and to provide the vehicle with a desired appearance, or "look". It may include features such as a traditional raised trailing edge to enhance deflection of wind, bugs, debris and the like away from the vehicle's front windshield, or alternately a downturned trailing edge (as at 36 in FIG. 5) to provide the vehicle with a currently desired bulky appearance. At least one hole 38 is provided in the deflector 30, or more commonly a plurality of holes 38 spaced along the length of the deflector, and each hole should be of an appropriate size and shape to permit the deflector to be mated to the pedestal, described below.

Figure 2A:
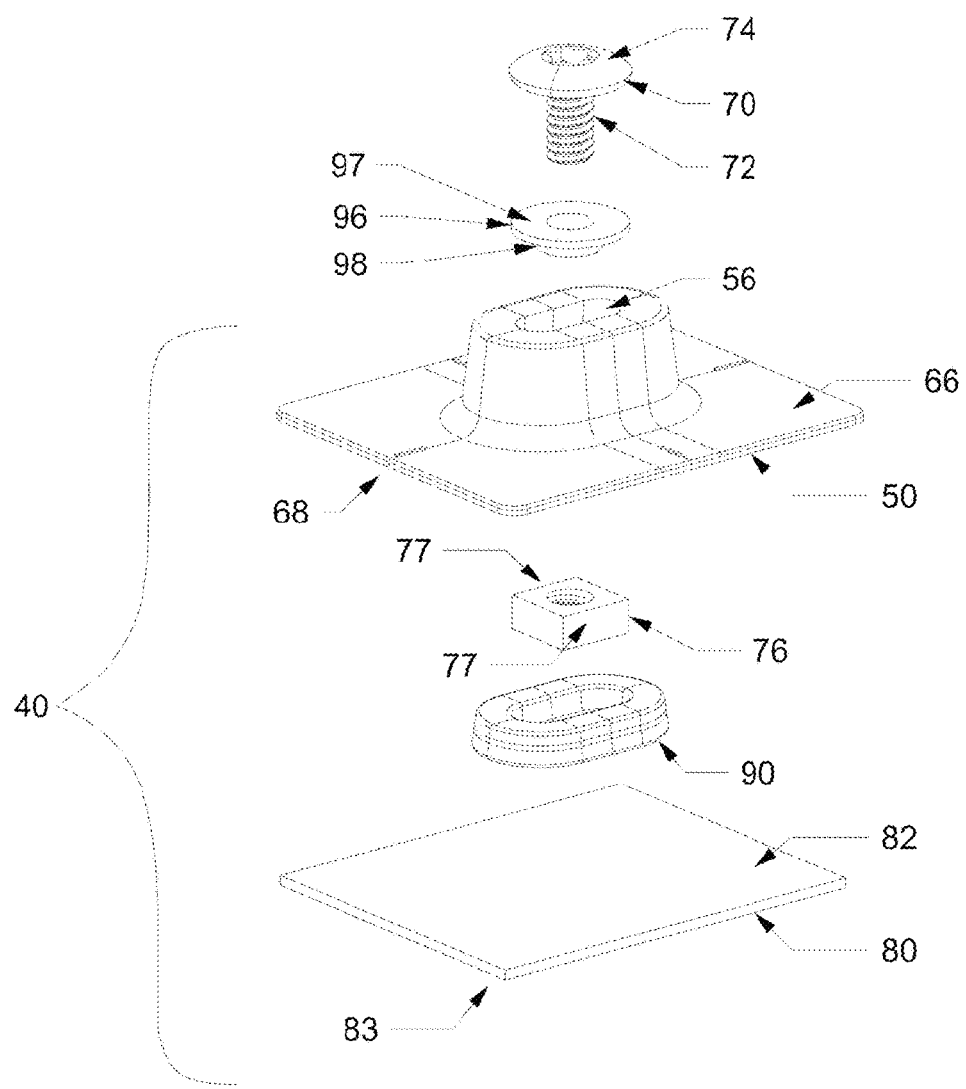
FIG. 2a is a perspective exploded view of a mounting pedestal according to a first embodiment of the present invention, including some complimentary components, before assembly and mounting to the vehicle hood.
Figure 3:
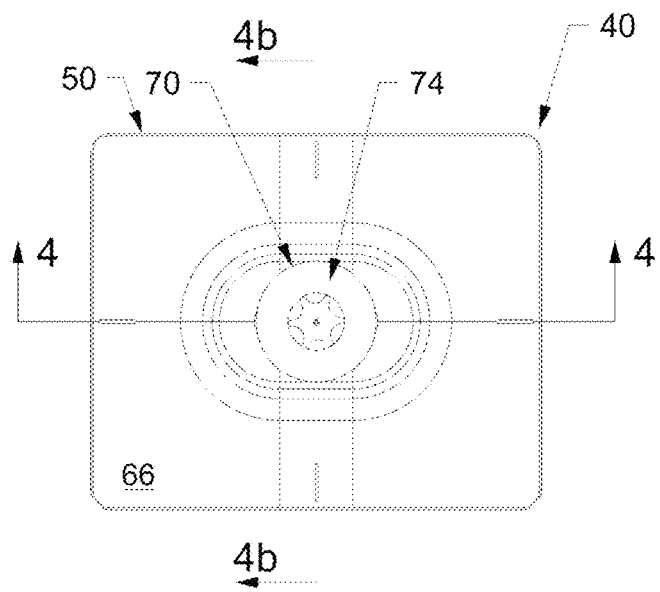
FIG. 3 is a top plan view of the mounting pedestal of FIG. 2a, assembled.

As best seen in FIG. 2a, a first embodiment of the pedestal 40 in essence features a hollow body 50 where a fastening assembly engages a top end of the body, and an adhesive means is at an opposed bottom end of the body, opposite the fastening assembly. As will be described in greater detail below, in use the pedestal's bottom end is typically bonded to the top of the hood 20 on its outside surface 26, and the deflector 30 is secured to the top end of pedestal's body 50 with the fastening assembly, such that the pedestal is generally located intermediate the deflector and the hood as illustrated in FIG. 5. Terms such as "top", "bottom", "front" or "forward", "rear" or "backward", "upper", "lower" and the like will be used for identifying certain features of the pedestal relative to the deflector or to the vehicle when placed on the hood. The use of these terms is not intended to limit the pedestal's use or orientation. Further, when describing the invention, all terms not defined herein have their common art-recognized meaning.

With reference now to FIGS. 2a to 7b, the pedestal's body 50 has a hollow core 52 (best seen in FIG. 4a) extending vertically therethrough from a first, top end 54a to an opposed second, bottom end 54b. The core adjacent the top end 54a forms an oblong slot 56 elongated along a longitudinal first, or long, axis 58 (FIG. 6b) and is narrower along a lateral second, or short axis 59. The oblong slot is sized to allow a stem 72 of the fastener 70, in this instance a threaded ¼-20 bolt, to freely pass through the slot and extend part-way into the hollow core, but not the larger bolt head 74 which in this instance has a diameter larger than the slot's width along the short axis 59. The oblong shape allows the bolt stem to freely slide along the slot in the direction of the long axis 58, namely in a first direction, for adjustable linear positioning therealong. The opposed second end 54b of the hollow core forms a through hole, or opening 60 for accessing the hollow core and is shaped to snugly mate with the plug 90. An intermediate portion of the hollow core located between the first and second ends 54a, 54b defines an oblong second slot 62 located below and adjacent to the oblong first slot 56. Both slots 56, 62 can be considered concentric as both are aligned with the same first and second axes 58, 59 (as viewed in FIG. 6b). The width of the second slot 62, measured along the short axis 59, is formed to loosely accept a nut member, or nut, 76 of the fastening assembly (in this instance a ¼-20 square nut), but is sized to contact opposed flat sides 77 of the nut, to resist and restrain the nut's rotation, to allow the bolt to be screwed into the nut without a user clamping the nut. The second slot's oblong shape allows the nut to freely slide along the second slot in the first direction for adjustable linear positioning therealong roughly matching the travel available to the bolt stem along the oblong first slot 56. However, the second slot 62 is sized with a larger periphery than the adjacent first slot 56 to form a shoulder stop 64 therewith, beneath the top end 54a of the body. The shoulder stop 64 prevents the nut from entering the first slot above, thus preventing the nut from escaping the second slot 62 through the first slot 56. The shoulder stop should not impeded the travel or linear adjustability of the bolt and nut along the first and second slots.

The bottom end 54b of the pedestal's body is flared outwardly about its periphery to create a relatively thin skirt 66. The skirt 66 forms a generally planar outer face 68 beneath the body adapted to accept an adhesive means for bonding the skirt, and thus the pedestal's body, to the outside surface 26 of the vehicle hood. A preferred adhesive means is a pad 80 having opposed inner and outer surfaces 82, 83, respectfully, where the inner surface 82 is adapted for mating, whether permanently or removably, with the planar face of the skirt, by mechanical or other means, and the outer surface 83 has an adhesive for bonding with the vehicle's outside surface. A preferred form of pad 80 is a double-sided tape with an adhesive inner and outer surface, for bonding to the skirt's planar face 68. The tape preferably extends over the skirt's entire rectangular face 68, to maximize available adhesion to both the pedestal and the hood. It will be appreciated that both the skirt and the tape may be provided with other shapes, such as circular, for both functional and aesthetic purposes. It will also be appreciated that, optionally, the double sided tape may be omitted if a user is tasked to apply an adhesive to the skirt's face 68 during the pedestal's installation process, or if the face 68 comes "pre-glued" from the factory with a peelable film thereon. However, these options are not preferred as they are considered less convenient to the user and more costly to produce, respectively.

Figure 7A:
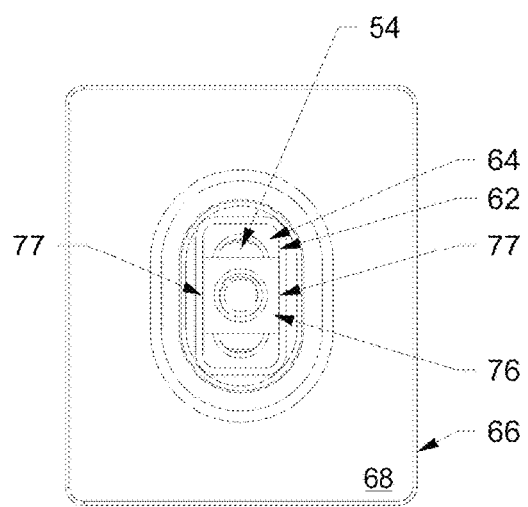
FIG. 7a is a plan view from below of the body of FIG. 6a with a nut inserted.
Figure 7B:
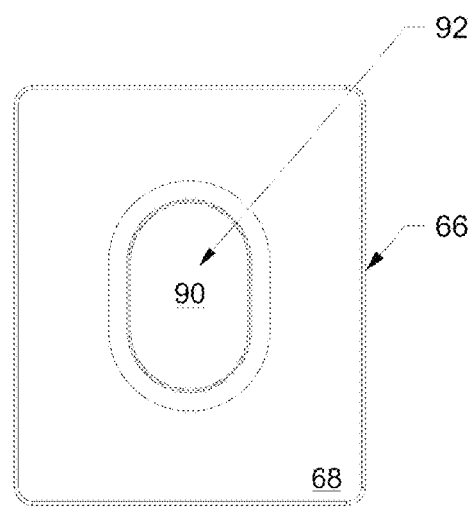
FIG. 7b shows the body of FIG. 7a with a plug inserted.
Figure 9:
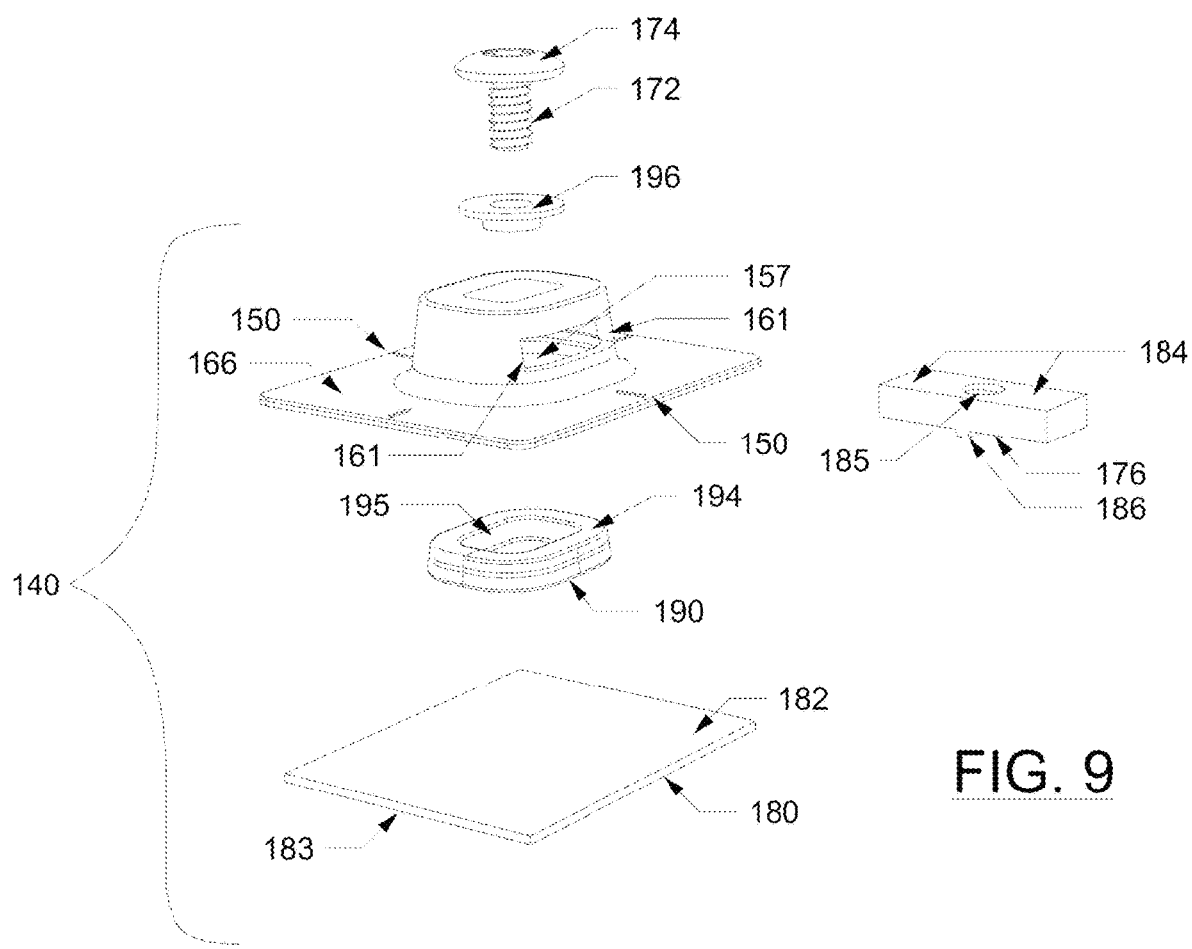
FIG. 9 is a perspective exploded view of a mounting pedestal according to a second embodiment of the present invention, including some complimentary components, before assembly.
Figure 10:
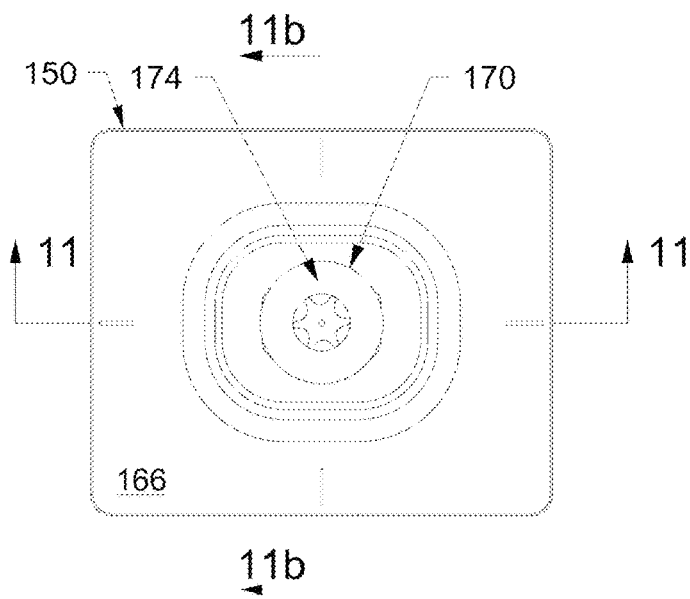
FIG. 10 is a top plan view of the mounting pedestal of FIG. 9.
Figure 11:
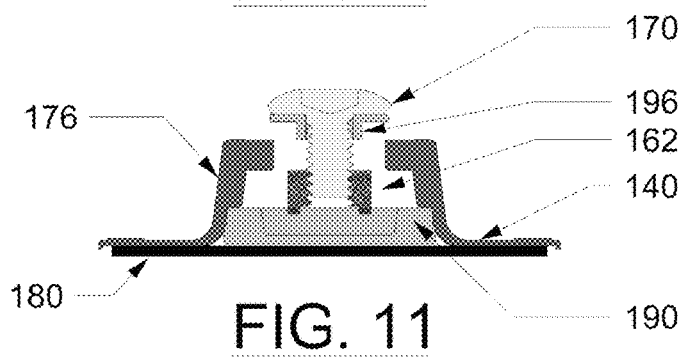
FIG. 11 is a cross-sectional view in elevation of the mounting pedestal along the line 11-11 of FIG. 10.
Figure 11A:
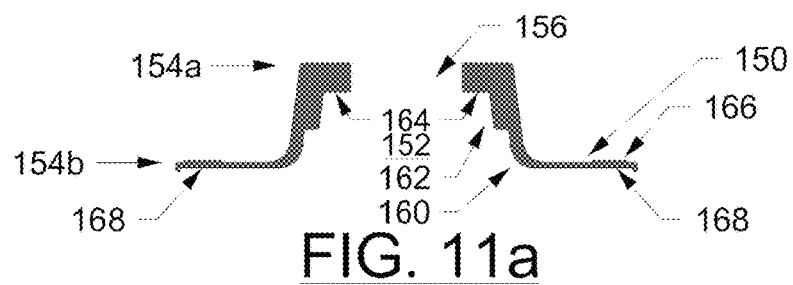
FIG. 11a is the same cross-sectional view as FIG. 11 but showing the body of the mounting pedestal in isolation.
Figure 11B:
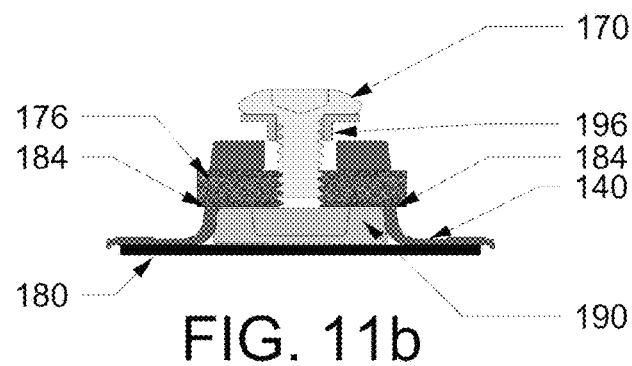
FIG. 11b is a cross-sectional view in elevation of the mounting pedestal along the line 11b-11b of FIG. 10, at right angle to the view in FIG. 11.
Figure 12:
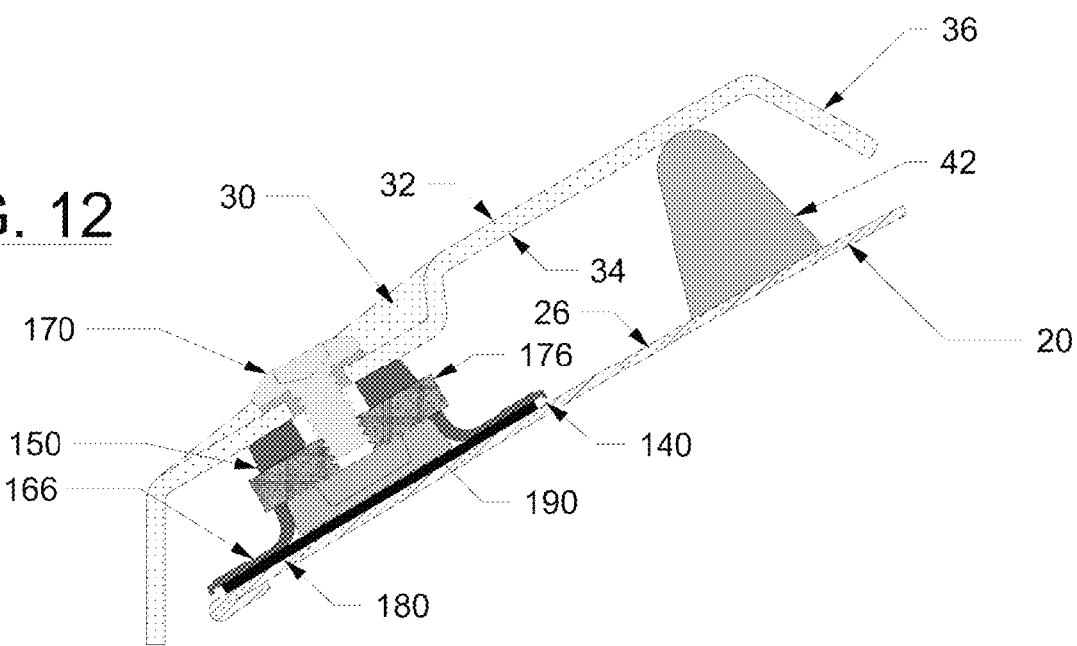
FIG. 12 is a cross-sectional view of a hood deflector secured to the mounting pedestal as seen in FIG. 11b which has been fixed to a vehicle's hood, and again illustrates use of an optional bumpon.
Figure 13B:
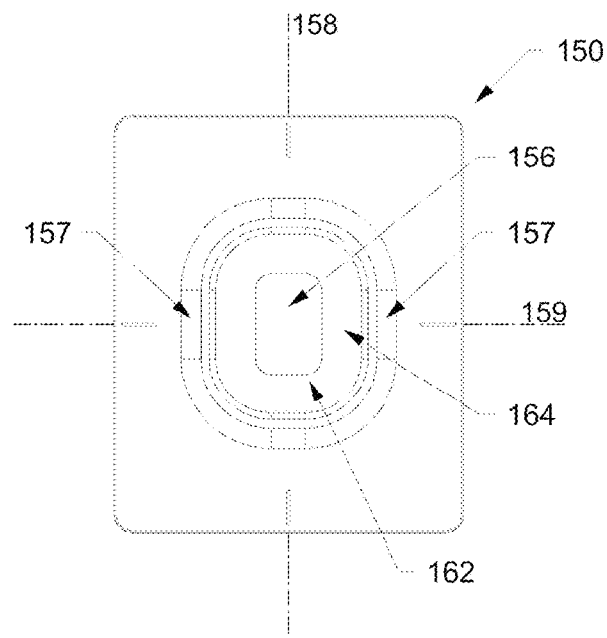
Figure 13A:
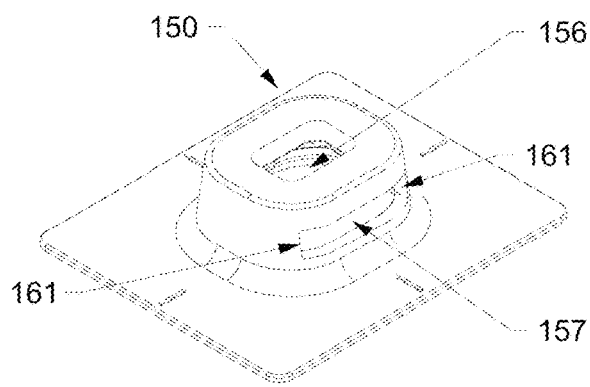
FIG. 13a is a perspective view of the body of the mounting pedestal of FIG. 9 shown in isolation.
Figure 13C:
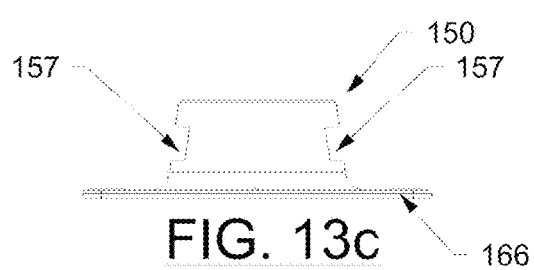
FIG. 13c is an elevational view of the body from the front of FIG. 13b.
Figure 13D:
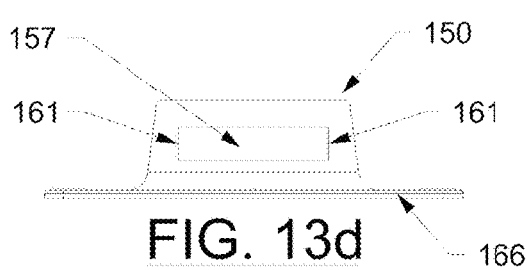
FIG. 13d is an elevational view of the body from the right side of FIG. 13b.
Figure 14A:
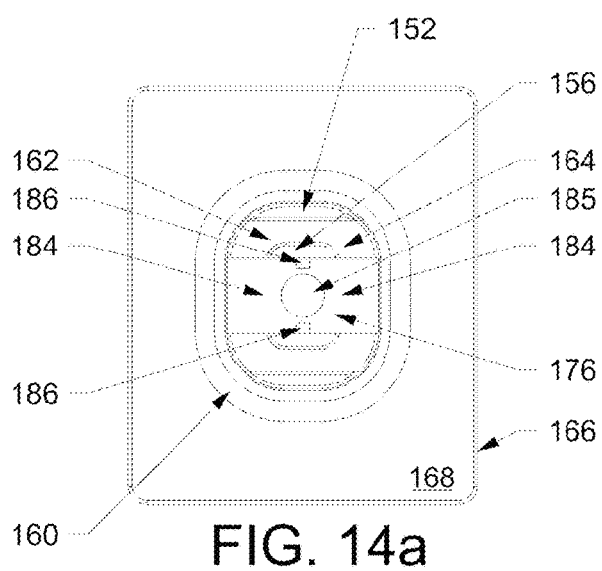
FIG. 14a is a plan view from below of the body of FIG. 13a with a bar nut inserted.
Figure 14B:
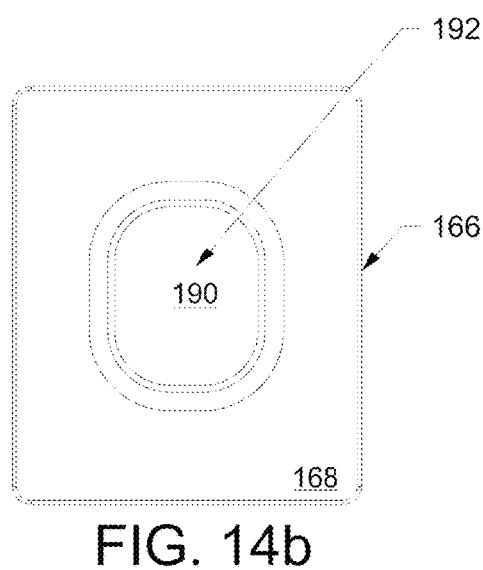
FIG. 14b shows the body of FIG. 14a with a plug inserted.
Figures 15A, 15B:
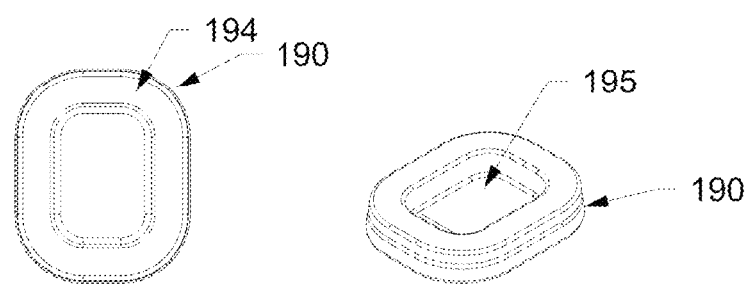
Figures 15C, 15D:
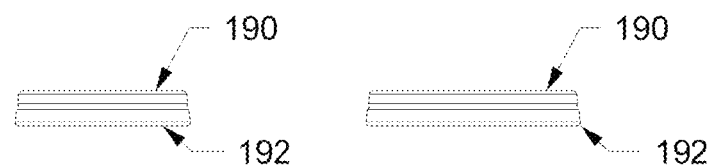
FIG. 15c is an elevational view of the plug from the front of FIG. 15b.
FIG. 15d is an elevational view of the plug from the right side of FIG. 15b.

The pedestal should be provided with a plug 90 of the type shown in FIGS. 8a-8d, for mating with the opening 60 at the bottom end 54b of the pedestal, after the nut 76 has been inserted into the second slot 62 of the hollow core. The oblong raised periphery of the plug's inner face 94 abuts the nut to retain it in the second slot, and the indented central cavity 95 of the plug reduces material usage and weight, and accommodates longer bolt stems that extend past the intermediate portion of the hollow core. The plug acts as a barrier between the fastening assembly and the hood's painted surface 26 to avoid contacting and damaging the hood. FIG. 7a shows the pedestal from beneath with the nut 76 inserted into the second slot 62 of the hollow core, but without the plug, and FIG. 7b is the same view after the plug 90 has been inserted into the pedestal body, thereby retaining the nut within the second slot. Once inserted, the outer faces 92, 68 of the plug and skirt, respectively, should be co-planar forming a substantially smooth flat surface for mating with the inner surface 82 of the adhesive pad 80. The pad and the plug therefore cooperate to secure themselves to the pedestal body. Rather than mounting the plug 90 and then the pad 80 sequentially to the body, a user may opt to first adhere the plug's outer face 92 to the pad's inner surface 82, and then mate that combination with the bottom end of the pedestal body, but that is not preferred due to the required precision of aligning the plug centrally on the pad prior to insertion. Alternately, it would be possible to either pre-mount the plug in correct alignment on the pad during the manufacturing process, or to produce the plug and pad as a singular element, but this is not preferred due to greater production costs.

Figure 4:
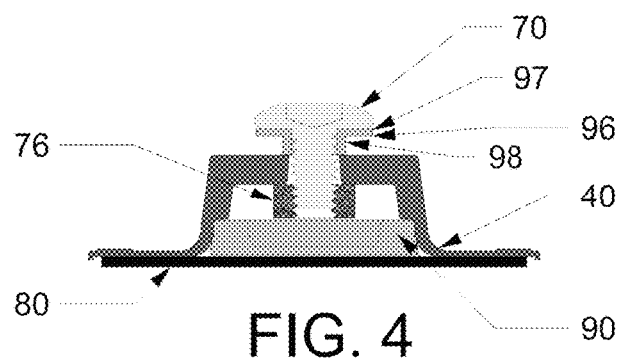
FIG. 4 is a cross-sectional view in elevation of the mounting pedestal along the line 4-4 of FIG. 3.
Figure 4A:
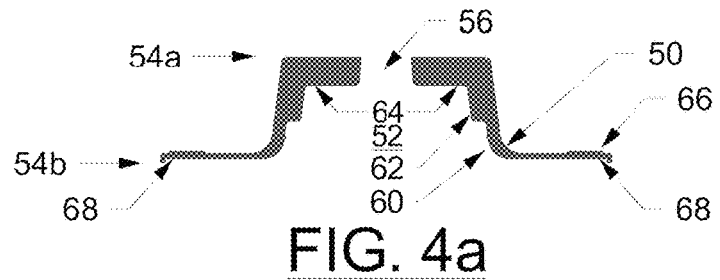
FIG. 4a is the same cross-sectional view as FIG. 4 but showing the body of the mounting pedestal in isolation.
Figure 4B:
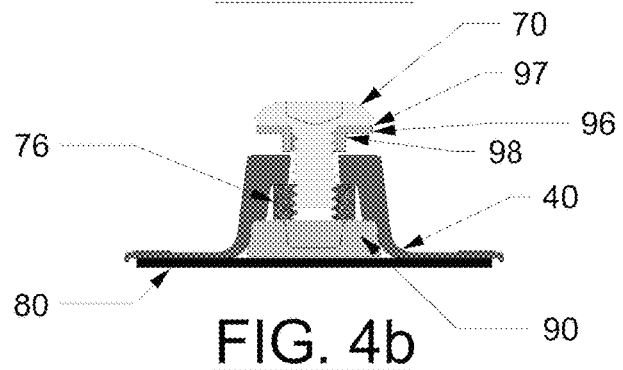
FIG. 4b is a cross-sectional view in elevation of the mounting pedestal along the line 4b-4b of FIG. 3, at right angle to the view in FIG. 4.

A shoulder washer 96 is provided as a complimentary component to fit into the deflector's hole and onto the fastener. As best seen in FIGS. 4 and 5, the washer's annular shoulder 97 should be of greater diameter than the deflector hole 38 to remain between the fastener head 74 and the deflector's top surface 32, to enhance load distribution through the deflector when the fastener is tightened into the pedestal body to retain the deflector. The washer's tubular stem 98 should slide over the bolt stem 72 and into the deflector hole, to a depth where it can help avoid crushing of the deflector if the bolt is overtightened, yet not so deep that it would interfere with proper bolt tightening. Typically the washer's stem depth will be chosen to not exceed the thickness of the deflector hole. It will be appreciated that the washer may be omitted where damage between the fastener head and the deflector hole is not a concern, for instance where an unusually large fastener head is being used or the deflector material is particularly sturdy. The washer itself may be made of an opaque material, such as a metal, or a clear material, such as plastic, depending on functional and aesthetic factors.

The operation and advantages of the present invention, with particular reference to the first embodiment, may now be better understood. In one sequence of installing a plurality of these pedestals onto the vehicle hood, to thereby mount the deflector to the hood, the location of each pedestal is first temporarily marked off along the outside surface 26 of the hood, typically in a line from one fender to the opposite fender roughly parallel to the hood's front edge 22 as shown in FIG. 2, using the deflector's center hole as a reference point. Each pedestal is then prepared for fixing to one of these marked spots by first placing the nut 76 into the oblong second slot 62, either via the opening hole 60 at the bottom end of the body (preferred method) or diagonally via the oblong first slot 56 at the top end of the body (optional method). Once the nut is oriented flat in the oblong second slot 62, the plug 90 should be mated with the opening 60 to retain the nut in that second slot. The adhesive on the inner surface 82 of the pad 80, in this case double sided tape, is then exposed, juxtaposed onto the outer face 68 of the skirt 66, and pressed thereon to bond therewith. This action should also result in the tape bonding with the plug's outer face 92, assuming the tape and plug are distinct elements. If the plug is incorporated with the pad, as discussed earlier, then this step of bonding the pad to the skirt also functions to retain the nut inside the pedestal's core. The pedestal body may now be bonded to hood at the designated location by either adding adhesive to the outer surface 83 of the pad, or in the case of double sided tape by peeling off a thin protective film to expose an adhesive on the outer surface, and then pressing the skirt onto the hood surface to fix the pedestal in place. For particularly wide deflectors, one or more resilient "bumpons" 42, shown in FIG. 5, may be adhered to desired locations on the hood relative to the fixed pedestals, so as to keep the deflector's trailing edge 36 from contacting the hood and/or from "fluttering" under wind loads once installed, as is known in the art.

Once all pedestal bodies 50 have been prepared and fixed to the hood in their designated locations as described above, the deflector 30 is lowered over the hood and brought to rest on the top end 54a of each pedestal body so as to align each of its holes 38 over a corresponding pedestal body. If a user opts to employ a shoulder washer 96, which is suggested, it is placed either in the deflector deflector hole 38 or onto the bolt, and the bolt stem is inserted through the deflector hole and through the first slot 56 at the top end of the body with the aim of engaging the nut 76, which can be slid inside the pedestal body by a user along the second slot 62. A distinct advantage of the present invention is not only the position adjustability of the nut relative to the bolt stem, but that the oblong nature of the first slot 56 gives a user considerable latitude in aligning all of the deflector holes 38 with a respective pedestal slot in a first direction along its long axis 58, since it can be extremely difficult to do so with multiple pedestals where the pedestal holes are made round and immovable, as in the prior art. In addition there should be some play between the bolt stem and the sides of the oblong first slot 56, to provide the bolt with some "wiggle room" along the second short axis 59, for aligning with the nut. Once aligned, the bolt is screwed into the nut to tightly sandwich the deflector between the bolt head 74 (and the shoulder 97 of the washer if used) and the top end 52 of the pedestal body, thereby fixing the deflector to the hood.

In a variant of the above installation sequence, the pedestal bodies are first bolted to respective holes 38 in the deflector before mounting and fixing that assembly into the desired location on the hood. In this sequence, the protective film on the outer surface 83 of the double sided tape 80 is retained to avoid exposing the adhesive thereon, while the opposed adhesive side 82 is adhered to the face 68 of the pedestal skirt 66. Once each pedestal body has been bolted to the deflector as previously described, the film on the outer surface 83 of the double sided tape may be removed to expose the adhesive, and then the deflector is carefully placed on the hood in its desired location, such that each pedestal's adhesive outer surface 83 engages the hood's surface 26 to fix the deflector thereto. An advantage of this variant is that the location of each pedestal on the hood does not need to be measured and marked off before installation begins. A disadvantage is that bumpon 42 installation, if desired, may be more difficult, if not impossible.

An optional feature of this pedestal is the inclusion of a small metal bracket 44 to help maintain a pedestal's skirt fixed adjacent the edge of a vehicle's surface, in this instance the flat front edge 22 of the hood 20 as shown in FIG. 5, and to act as a guide for locating the pedestal relative to that front edge. The bracket has a first portion 46 that clips under the front edge and over the pedestal skirt 66 closest to the hood's edge, thereby pressing the skirt to the hood. A second raised portion 48 of the bracket extends over the top end 54a of the pedestal body and has an aperture to allow the bolt stem to loosley pass therethrough. That aperture should be configured to reflect the shape of the oblong first slot 56 atop the pedestal body, and should be of sufficient size so as not to interfere with the adjustability of the bolt in the first slot. If the bracket is used, it should be clipped in place onto the hood edge and over the pedestal body, as shown, after the pedestal has been fixed to the hood, but before mounting the deflector to the pedestal. Once the deflector is mounted to the pedestal, the second portion 48 of the bracket is firmly sandwiched between the deflector and the pedestal body, and thus resists forces attempting to lift the pedestal from the hood during use. An anti-abrasion pad 49 may be included beneath the bracket's clip portion 46, to avoid the bracket scratching or damaging the finished surface at the hood's edge 22.

A second embodiment of the present invention is shown in FIGS. 9 to 15d. Earlier reference numerals with the prefix "1" are used to identify like elements from the first embodiment. A distinguishing feature of the pedestal 140 of the second embodiment is the greater range of lateral adjustability of the fastener 170 in the pedestal body 150 along the second, short axis 159 (FIG. 13b), namely in a second direction, than in the first embodiment. The range of adjustability in the first direction, along long axis 158, is roughly the same in this instance as in the first embodiment, although it may be made different if desired. As a result, the oblong first slot 156 is wider than the first slot 56 of the first embodiment (FIG. 6b), resulting in a greater width-to-length ratio in the second embodiment where the first slot 156 may in some instances approach being square (namely up to a 1:1 ratio). This wider plan profile carries downwardly through the pedestal body's hollow core 152, and is reflected in the wider second oblong slot 162, bottom end 154b and opening 160. The width of the skirt 166 may also be augmented, but in this instance the skirt's peripheral dimensions are kept substantially the same as the skirt 66 in the first embodiment since the surface area of the skirt's planar face 168 should be adequate for bonding to the hood.

Depending on the degree of lateral adjustability desired in the second direction in this second embodiment, at a certain point using a square nut (as illustrated in FIG. 2a for the first embodiment) is not advised as it might disengage from the wider second slot 162 and pull out the top of the pedestal body 150 through the first slot 156. To ensure proper retaining contact between the nut and the shoulder stops 164 formed under the first slot 156, the nut of the second embodiment is inventively configured as a "bar nut" 176 with opposed laterally extending flanges 184, where these elongate flanges remain in contact with the shoulder stops regardless of the position of the bolt stem 172 in the first slot 156, particularly in the second direction.

Due to the length of the bar nut's flanges 184 and its greater lateral adjustability, another inventive feature of the pedestal body 150 are the elongate slits 157 notched into laterally opposed sides of the intermediate portion 162 of the pedestal body 150, each extending in the first direction parallel to the long axis 158 of the body. Each slit 157 is sized to allow one of the bar nut flanges 184 to project therethrough, and to avoid impeding the range of linear adjustability of the bolt stem 172 and of the bar nut 176 within the first and second slots 156, 162, along the first and second axes 158, 159, respectively. Hence, when the bar nut is housed in the pedestal body within the second slot 162, it has a sliding range in both the first and second directions, yet is prevented from disengaging the pedestal body, to not slip out through the side slits for instance. This is achieved by thickening the bar nut on each narrower side of its threaded hole 185, creating protruding nubs 186, which also reinforce the bar nut against the greater flexural forces exerted on the flanges 184, compared to a square nut. Upon assembly of the pedestal body, the nubs 186 engage the periphery of the slits 157 when the bar nut is slid laterally in the second direction, thus stopping the bar nut from escaping through the slits. Further, the sizing of the slits also advantageously limits rotation of the bar nut, for screwing the bolt 170 into the bar nut without any exterior clamping of the nut. Rather, rotation of the bar nut is arrested when its flanges 184 contact the short edges 161 of the slits, to prevent the nut from rotating with the bolt stem 172.

The assembly and use of the pedestal's second embodiment resembles that of the first embodiment as previously described, except that the bar nut 176 must be mounted into the second slot 162 at a diagonal so that one of the flanges 184 slides through one of the slits 157 until the nubs 186 are adjacent thereto, and then the other flange 176 may be lifted into the second slot and retained therein by sliding that flange into the other slit 157. This step is best done from below via the opening 160 as it will typically be larger than the first slot 156 at the top end. Once the pedestal has been assembled, the fastener has a broader latitude of adjustability, along a plane in two dimensions (i.e. in the first and second directioned parallel to the axes 158, 159, respectively) within the first and second slots 156, 162 rather than in a single linear range along the first axis 62 of the first embodiment, providing a user with a larger margin of error in placement of the pedestals on the hood, to ensure that the deflector holes line up with the pedestals and that the deflector is aligned correctly on the hood.

Some other advantages or the present invention may now be appreciated. The pedestals provide a means of mounting a deflector to virtually any vehicle's hood regardless of its thickness or configuration, as the pedestal need not be located beside any particular feature of the hood, such as its front edge, for clamping thereto. The pedestals do not require any drilling into the hood. Although a single bolt stem length can adequately accommodate a wide variety of deflector thicknesses, the pedestal can be used with virtually any thickness of deflector by merely using a slightly shorter or longer bolt as needed. In any event, the pedestal will create and maintain a barrier between the bolt and hood to prevent contact and damage thereto.

The above description is intended in an illustrative rather than a restrictive sense, and variations to the specific configurations described may be apparent to skilled persons in adapting the present invention to other specific applications. Further, the scope of the claims below should not be limited by the preferred embodiments set forth herein, but should be given the broadest interpretation consistent with the above description as a whole.

I claim:

1. A pedestal for mounting an object onto a structure using a fastener, said pedestal comprising:
   a body with a hollow core having:
   (i) a first end wherein said core forms an oblong first slot to permit insertion of said fastener therethrough and to allow said fastener to slide in a first direction along a longitudinal first axis for adjustability therealong;
   (ii) an opposed second end having an opening into said hollow core and a skirt formed about a periphery thereof defining a generally planar outer face; and,
   (iii) an intermediate portion between said first and second ends defining an oblong second slot aligned generally concentrically with said first slot for slidably receiving a nut member and restraining its rotation therein, said second slot being sized with a larger periphery than said first slot to form a shoulder stop therewith to block entry of said nut member into said first slot and to not impede a linear adjustability along said first axis; and,
   a pad with an inner surface for mating with said outer face of said skirt and an opposed outer surface for bonding with said structure;
   wherein said fastener secures said object to said first end of said body upon tightening said fastener to said nut member in said second slot.

2. The pedestal of claim 1 further including a washer for mounting on said fastener and sized to fit through a hole in said object, said washer having an annular shoulder for location intermediate a head of said fastener and a top surface of said object to enhance load distribution therebetween.

3. The pedestal of claim 1 wherein said pad has an adhesive inner surface for bonding to said outer face of said skirt, upon placing said nut member into said hollow core, and an adhesive outer surface, protected by a removable coating prior to use, for bonding to said structure.

4. The pedestal of claim 1 further comprising a plug for mating with said opening at said second end of said body to retain said nut member in said second slot.

5. The pedestal of claim 4 wherein said plug has a planar outer face for mating with said inner surface of said pad.

6. The pedestal of claim 4 further including a washer for mounting on said fastener and sized to fit through a hole in said object, said washer having an annular shoulder for location intermediate a head of said fastener and a top surface of said object to enhance load distribution therebetween.

7. The pedestal of claim 6 wherein said pad has an adhesive inner surface for bonding to said outer face of said skirt, upon placing said nut member into said hollow core, and an adhesive outer surface, protected by a removable coating prior to use, for bonding to said structure.

8. The pedestal of claim 1 wherein opposed sides of said body at said intermediate portion are notched to form elongate slits therethrough, each slit extending in said first direction along a longitudinal axis generally parallel to said first axis to not impede said linear adjustability along said first slot.

9. The pedestal of claim 8 wherein said first slot is sized in a second direction along a lateral second axis generally perpendicular to said longitudinal first axis to allow for adjustability in said second direction in addition to adjustability in said first direction.

10. The pedestal of claim 9 further comprising a plug for mating with said opening at said second end of said body to retain said nut member in said second slot.

11. The pedestal of claim 10 further including a washer for mounting on said fastener and sized to fit through a hole in said object, said washer having an annular shoulder for location intermediate a head of said fastener and a top surface of said object to enhance load distribution therebetween.

12. The pedestal of claim 8 wherein said nut member includes opposed elongate flanges, each flange being sized to project through one of said slits when inserted in said second slot of said hollow core.

13. The pedestal of claim 12 comprising at least one protrusion from said nut member intermediate said flanges for engaging a periphery of said slits to stop said nut member from escaping said hollow core through said slits.

14. The pedestal of claim 12 wherein said first slot is sized in a second direction along a lateral second axis generally perpendicular to said longitudinal first axis to allow for adjustability in said second direction in addition to adjustability in said first direction.

15. The pedestal of claim 14 further including a washer for mounting on said fastener and sized to fit through a hole in said object, said washer having an annular shoulder for location intermediate a head of said fastener and a top surface of said object to enhance load distribution therebetween.

16. The pedestal of claim 14 further comprising a plug for mating with said opening at said second end of said body to retain said nut member in said second slot.

17. The pedestal of claim 16 further including a washer for mounting on said fastener and sized to fit through a hole in said object, said washer having an annular shoulder for location intermediate a head of said fastener and a top surface of said object to enhance load distribution therebetween.

18. The pedestal of claim 17 comprising at least one nub protruding from said nut member intermediate said flanges for engaging a periphery of said slits to stop said nut member from escaping said hollow core through said slits.

19. A pedestal system for mounting an accessory with at least one hole therethrough onto a vehicle surface comprising:
 a fastening assembly having a fastener with a head and stem, and a nut for mechanically engaging said stem;
 a body having:
  (a) a hollow core with:
   (i) a first end wherein said core forms an oblong first slot for passing said stem therethrough and allowing said fastener to slide in a first direction along a longitudinal first axis for adjustability therealong;
   (ii) an opposed second end having an opening into said hollow core; and,
   (iii) an intermediate portion between said first and second ends defining an oblong second slot aligned generally concentrically with said first slot for receiving said nut and restraining its rotation therein, said second slot being sized with a larger periphery than said first slot to form a shoulder stop therewith to block entry of said nut into said first slot and to not impede a linear adjustability along said first axis; and,
  (b) a skirt formed about a periphery of said body at said second end defining a generally planar outer face; and,
 a pad with an inner surface for mating with said outer face of said skirt and an opposed outer surface for bonding with said vehicle surface;
 wherein said fastener stem is adapted to pass through said hole in said accessory to sandwich said accessory between said fastener head and said first end of said body upon tightening said fastener to said nut in said second slot.

20. The pedestal system of claim 19 wherein said first slot is sized in a second direction along a lateral second axis generally perpendicular to said longitudinal first axis to allow for adjustability in said second direction in addition to adjustability in said first direction.

* * * * *